No. 870,984. PATENTED NOV. 12, 1907.
C. W. MEINECKE & D. HOGAN.
BED PAN.
APPLICATION FILED SEPT. 7, 1906.
2 SHEETS—SHEET 1.
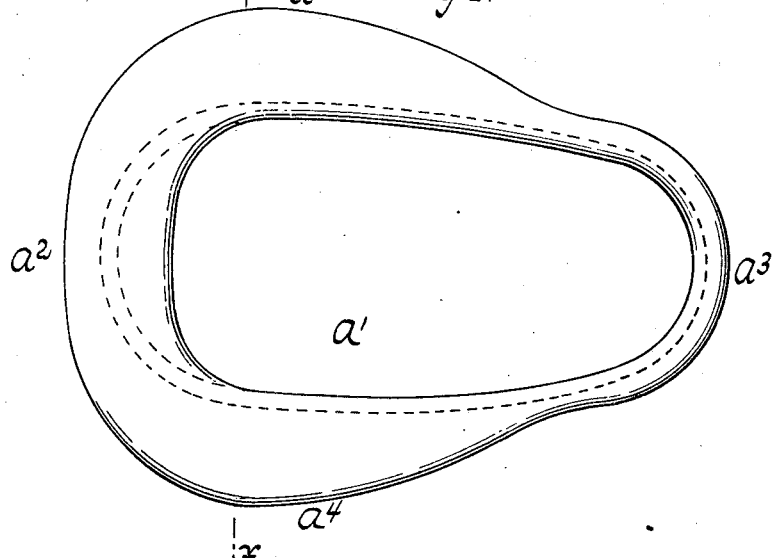
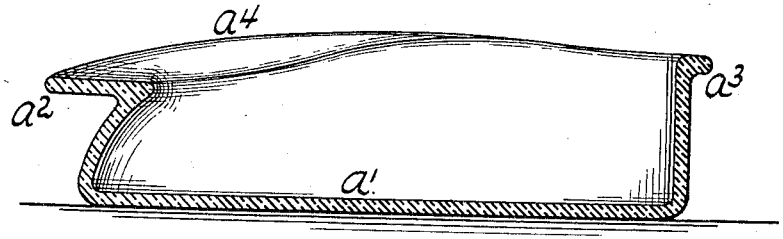
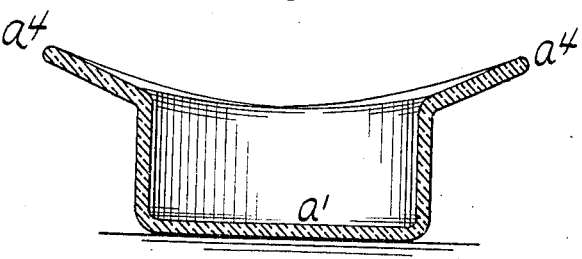
WITNESSES:
William Miller
Edward Wiesner
INVENTORS
Christian William Meinecke
Daniel Hogan
BY
W. C. Hauff
ATTORNEY No. 870,984. PATENTED NOV. 12, 1907.
C. W. MEINECKE & D. HOGAN.
BED PAN.
APPLICATION FILED SEPT. 7, 1906.

2 SHEETS—SHEET 2.

WITNESSES:

INVENTORS
Christian William Meinecke
Daniel Hogan
BY
W. C. Hauff
ATTORNEY

UNITED STATES PATENT OFFICE.

CHRISTIAN WILLIAM MEINECKE, OF JERSEY CITY, AND DANIEL HOGAN, OF HOBOKEN, NEW JERSEY, ASSIGNORS TO WHITALL TATUM COMPANY, OF NEW YORK, N. Y., A CORPORATION OF NEW JERSEY.

BED-PAN.

No. 870,984.　　　　　Specification of Letters Patent.　　　　Patented Nov. 12, 1907.

Application filed September 7, 1906. Serial No. 333,699.

*To all whom it may concern:*

Be it known that we, CHRISTIAN WILLIAM MEINECKE and DANIEL HOGAN, both citizens of the United States, residing at Jersey City and Hoboken, respectively, in the county of Hudson and State of New Jersey, have invented new and useful Improvements in Bed-Pans, of which the following is a specification.

This invention relates to a bed pan, all parts of which are open to inspection and allowing ready access and cleaning. The shape of the pan provides ample support to the user and relieves pressure from the spine and the pan can be readily emptied and cleaned. In cases of typhoid or contagious diseases a water proof paper receptacle can be placed in the pan. Such suitably shaped receptacle with the contents can be removed and burned.

This invention is set forth in the following specification and claims and illustrated in the annexed drawing, in which.

Figure 4:
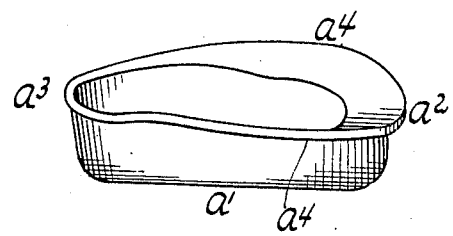
Figure 5:
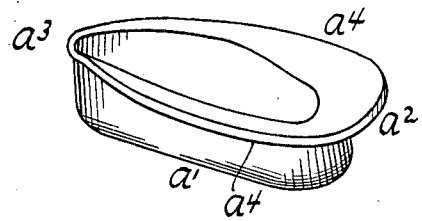

Figure 1 is a plan view of a bed pan embodying this invention. Fig. 2 is a longitudinal section of Fig. 1. Fig. 3 is a section along $xx$ Fig. 1. Figs. 4 and 5 show perspective views of the pan.

In the drawings the letter $a'$ indicates the bottom of the pan. The letter $a^2$ may be called the "front" end, for it is at this end the device is started into position under the user or patient. The opposite end $a^3$ may, for convenience of description, be called the "rear" end. An outwardly-extended body-support or flange is shown at $a^4$. This flange is inclined from its outer edge downward or slants toward the bottom of the pan and is curved to fit the back and buttocks.

At the forward end the pan is recessed. This recessed or undercut portion prevents slopping or overflow. When the pan is drawn away from the user the surge of the contents coming into the recess will be arrested so that overflow or spilling is avoided. This recess is so gradual or of such slight slope or inclination as to leave the entire interior visible and readily accessible for cleaning.

A paper receptacle can be slipped into the pan and which paper can be removed and burned. Such paper could be impervious or paraffined to be water proof.

The pan possessing considerable capacity and also allowing the entire interior to be visible and accessible for cleaning furnishes an article such as has long been demanded by hospital superintendents, boards of health, army surgeons and the like.

We claim:

A bed pan with a vertical side and rear wall and having a recessed front portion, an outwardly extended flange above and extended beyond said recessed portion, said flange inclined towards the said recessed portion and curved to fit the back and buttocks of the user, and an upwardly extending inclined curve for a thigh support for said user.

In testimony whereof we have hereunto set our hands in the presence of two subscribing witnesses.

CHRISTIAN WILLIAM MEINECKE.
　　　　　　　　　DANIEL HOGAN.

Witnesses:
　　EDWARD WIESNER,
　　GEORGE HULSBERG.